H. E. WARREN.
SELF STARTING SYNCHRONOUS MOTOR.
APPLICATION FILED FEB. 2, 1918.

1,390,320.

Patented Sept. 13, 1921.

INVENTOR.
Henry E. Warren
BY Jas. H. Churchill
ATTORNEY.

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

SELF-STARTING SYNCHRONOUS MOTOR.

1,390,320.  Specification of Letters Patent.  Patented Sept. 13, 1921.

Application filed February 2, 1918. Serial No. 215,029.

*To all whom it may concern:*

Be it known that I, HENRY E. WARREN, a citizen of the United States, residing in Ashland, in the county of Middlesex and State of Massachusetts, have invented an Improvement in Self-Starting Synchronous Motors, of which the following description, in connection with the accompanying drawings, is a specification, like characters on the drawings representing like parts.

This invention relates to a self-starting synchronous motor for use on alternating current systems, and has for its object to provide a motor of the character described which is simple in construction and of increased power in operation.

To this end, the motor is provided with a rotor having a starting member, and a synchronizing member which latter is normally inactive but is automatically rendered active by centrifugal force as will be described.

The particular features of the invention will be pointed out in the claims at the end of this specification.

Figure 1:
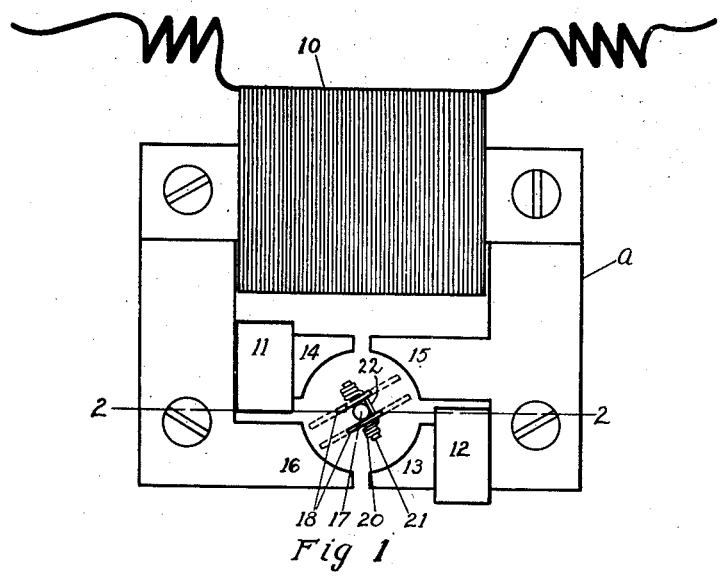
Figure 2:
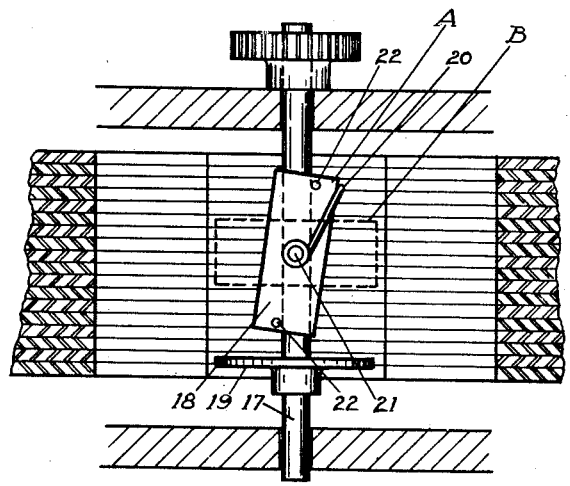

Figure 1 is a plan of a self-starting synchronous motor embodying this invention, and Fig. 2, a vertical section on the line 2—2, Fig. 1.

Referring to the drawing *a* represents one form of bi-polar field magnet, constituting the stator of the motor, and provided with an energizing coil 10, shading coils 11, 12, for the purpose of causing a time lag of the magnetic intensity in pole-faces 13 and 14 behind that in the pole-faces 15 and 16, so as to produce a pulsating or so called rotating magnetic field with elliptical characteristics about the shaft 17.

Upon the shaft 17 is mounted a rotor having a starting member, preferably in the form of a thin flat disk or ring 19 of hardened steel, and also having thereon a polar member having substantially strong synchronizing characteristics, which latter member is normally inactive when the rotor is at rest but is automatically brought into action by the rotation of the starting member 19 and shaft 17.

The polar member is preferably made as herein shown and consists of one or more hardened steel bars or pieces mounted to turn in a vertical plane on a horizontal pivot pin 21 carried by the shaft 17. In the present instance the polar member is shown as composed of two bars 18, located on opposite sides of the shaft 17, and normally turned by a spring 20 into a position substantially axial with the shaft 17, and said polar member is prevented from being moved by the spring 20 into a position exactly parallel to the shaft 17 by a stop pin 22 carried by the bars 18 and engaging the shaft 17. In operation, rotation of the shaft 17 and its rotor members is started by action of the rotating magnetic field on the starting member 19, which has relatively strong starting characteristics, and as the shaft 17 is rotated the polar member 18 is swung about its axis 21 by centrifugal force together with the magnetic attraction due to the magnetic field, into a position substantially at right angles to that it occupies when the rotor is at rest, which position is represented by the dotted lines and marked B and may be designated the active position of the polar member in which it is strongly polar and has strong synchronizing characteristics, whereas the position indicated by the full lines and marketd A may be designated the inactive position in which the member is substantially non-polar and has minimum synchronizing characteristics. After the polar member 18 has been moved into its active position, the shaft 17 is rapidly brought up to cynchronous speed and maintained there with considerable power by the rotor member 18.

When the current is cut off from the motor, the rotor member 18 is turned by the spring from its active position B into its inactive position A.

The motor herein shown is especially designed to operate as a single-phase motor but it is not desired to limit the invention in this respect.

Furthermore it is not desired to limit the invention to the particular construction of motor herein shown.

I may prefer to employ the member 19 in addition to the member 18, but it is not desired to limit the invention in this respect, as the member 18 alone may be used for starting and synchronizing.

Claims:

1. In a self-starting synchronous motor for alternating current, means for producing a rotating magnetic field, and a rotor which is substantially non-polar when at rest and strongly polar when in motion comprising an element arranged to be acted upon directly by centrifugal force to transform said rotor from the first condition into the second.

2. In a self-starting synchronous motor for alternating current, means for producing a rotating magnetic field, a rotor which is substantially non-polar when at rest and strongly polar when in motion comprising a movable member arranged to be acted upon directly by centrifugal force to transform said rotor from the first condition to the second condition, and means for restoring said member to its original position when said rotor stops.

3. In a self-starting synchronous motor for alternating current, means for producing a rotating magnetic field, a rotor which is substantially non-polar when at rest and strongly polar when in motion comprising a movable member arranged to be acted upon directly by centrifugal force to transform said rotor from the first condition to the second condition, means for restoring said member to its original position when said rotor stops, and a second member for starting said rotor into motion when the field is energized.

4. In a self-starting synchronous motor for alternating current, means for producing a rotating magnetic field, and a rotor comprising a starting member, and a member having relatively strong synchronizing characteristics, said latter member being automatically movable within said magnetic field from a position wherein its synchronizing characteristics are relatively inactive when the said member is at rest, into a different position within said magnetic field which is at an angle to the first mentioned position and wherein its synchronizing characteristics become active when the said member is in motion.

5. In a self-starting synchronous motor for alternating current, means for producing a rotating magnetic field, and a rotor having a starting member, and a synchronizing member which is within said magnetic field and is normally inactive when the rotor is at rest, but is automatically rendered active within said field when the starting member is rotated.

6. In a self-starting synchronous motor for alternating current, a rotor comprising a substantially circular member of hardened steel rotatable in one plane, a shaft on which said member is mounted, and a bar of hardened steel pivotally mounted on said shaft to turn in a plane at an angle to the first mentioned plane and movable by centrifugal force from an inactive into an active position.

7. In a self-starting synchronous motor for alternating current, a rotor comprising a starting member rotatable in one plane, a shaft on which it is mounted, and a synchronizing member rotatable with said shaft and movable in a plane at an angle to the first mentioned plane from an inactive into an active position when said shaft and starting member are in motion.

8. In a self-starting synchronous motor for alternating current, a rotor having a synchronizing member normally inactive in one position within the field of the motor when the rotor is at rest and automatically movable into an active position within said field at an angle to its inactive position by the action of centrifugal force directly upon it when the rotor is in motion.

9. In a self-starting synchronous motor, means for producing a rotating magnetic field, and a rotor comprising a substantially non-polar starting member and a polar synchronizing member arranged to be inactive within said field when at rest but rendered active by centrifugal force.

10. In a self-starting synchronous motor, means for producing a rotating magnetic field, and a rotor comprising a non-polar starting member and a synchronizing member arranged to be moved into active position within said field by centrifugal force.

11. In a self-starting synchronous motor, means for producing a rotating magnetic field, and a rotor comprising a non-polar starting member, and a synchronizing member arranged to be moved into active position within said field by centrifugal force, said rotor being provided with means to restore said synchronizing member to inactive position within said field when the rotor comes to rest.

12. A rotor for a self-starting synchronous motor, comprising a shaft, a non-polar part rigidly secured to said shaft for starting, and a polar part movably secured to said shaft and adapted to be moved by centrifugal force to a position within said field for synchronizing the rotation of the rotor.

In testimony whereof I have signed my name to this specification.

HENRY E. WARREN.